Jan. 18, 1966     W. B. FOSSER     3,229,411
PUPPET THEATER APPARATUS

Filed Oct. 23, 1961     6 Sheets-Sheet 1

INVENTOR.
WILLIAM B. FOSSER
BY
Charles B. Cannon
His Atty.

Jan. 18, 1966  W. B. FOSSER  3,229,411
PUPPET THEATER APPARATUS

Filed Oct. 23, 1961  6 Sheets-Sheet 2

INVENTOR.
WILLIAM B. FOSSER
BY
Charles B. Cannon
His Atty.

Jan. 18, 1966    W. B. FOSSER    3,229,411
PUPPET THEATER APPARATUS

Filed Oct. 23, 1961    6 Sheets-Sheet 4

INVENTOR.
WILLIAM B. FOSSER
BY Charles O. Cannon
His Atty.

Jan. 18, 1966  W. B. FOSSER  3,229,411
PUPPET THEATER APPARATUS
Filed Oct. 23, 1961  6 Sheets-Sheet 5

INVENTOR.
WILLIAM B. FOSSER
BY Charles B. Cannon
His Att'y.

United States Patent Office 3,229,411
Patented Jan. 18, 1966

3,229,411
PUPPET THEATER APPARATUS
William B. Fosser, 1100 S. Mason Ave., Chicago 44, Ill.
Filed Oct. 23, 1961, Ser. No. 146,840
2 Claims. (Cl. 46—13)

This invention relates to a puppet theater of the general kind in which puppets are movable between various locations on a stage and are adapted to be manipulated from beneath the stage.

It is a primary object of this invention to achieve an effect of realism in a puppet theater of this general kind by having resort to a novel construction and arrangement of the component parts of the puppet theater.

The puppet theater of the present invention is especially adapted to be utilized to portray the settings and the action of the characters of grand opera productions, such as Verdi's "Aida," Wagner's "The Flying Dutchman," and the like. In such instances the puppet figures corresponding to the characters of the opera are manipulated in accompaniment to suitable recordings of the opera.

Other and specific objects of the present invention are to so dimension and proportion the puppet figures with respect to the other parts of the puppet theater and to so position the entire puppet theater relative to the viewers in the audience that the scale of the Grand Opera setting is achieved in a quite realistic manner.

It is a further object of this invention to incorporate a novel proscenium in a puppet theater of the general kind described to enhance the effect of realism.

In accordance with the present invention the proscenium is formed with a circular opening, the upper extent of which affords an arched opening for a stage. The stage is positioned substantially at the eye level of the various viewers in the audience and slightly below the center of the circular opening in the proscenium. The proscenium includes a scenery holder for enabling an appropriate frontpiece to be positioned between the lower portion of the stage and the circular opening in the proscenium. The scenery holder serves the dual function of blocking the lower portion of the stage from the view of the audience while lending realism to the setting of the puppet theater. The proscenium also includes an illusion curtain and a blackout curtain, both of which may be moved across the circular opening between the various acts of the opera or other puppet theater production. An annular light chamber is incorporated in the proscenium for illuminating the illusion curtain during such times as the curtain may be closed; and to incorporate the foregoing features in a novel proscenium constitute further objects of the present invention.

It is another object of the present invention to incorporate a novel stage construction and to associate novel puppet apparatus therewith in a puppet theater which includes a proscenium as described above. The stage includes a series of track members defining a plurality of trackways for supporting a puppet apparatus for sliding movement therein. The trackways are interconnected so that a puppet can be moved to any desired location on the stage. In accordance with the present invention each of the track members is formed with a pair of horizontally extending and vertically spaced flanges which partly define the sides of the trackways, and such a flanged construction is adapted to cooperate with a puppet apparatus in a unique manner presently to be described. Each individual track member can be adjustably positioned to facilitate accurate alignment of a puppet apparatus slidably positioned within the trackway. Such a stage construction incorporating the above noted features represents another object of the present invention.

The puppet apparatus of the present invention includes a figure having component parts connected together in articulated connections so as to be movable to simulate various movements of corresponding parts of the human body, and such a figure is supported on support structure which includes a circular platform member adapted to be slidably received in closely fitted relation between the spaced flanges of the track members defining the trackways described hereinabove. A support shaft extends transversely through the center of the platform member and mounts the puppet figure on the upper end thereof. The support platform and the shaft are adapted to be interconnected to one another at a fixed axial position on the shaft to determine the standing position of the figure, but the platform is adapted to be released from and slidable axially on the support shaft in the course of moving the puppet figure from a standing to a setting position. To facilitate such movement of the puppet figure from a standing to a setting position a handle is affixed to the lower end of the shaft, and as will be described in detail in the specification to follow, the coaction between the flanged construction of the track members of the stage and the edge portions of the platform member which are engaged between such flanges enable such manipulation of the puppet figure to be obtained. It is therefore another object of this invention to incorporate the foregoing enumerated features in a puppet apparatus for the purposes described.

The torso of the puppet figure is of a two-part construction in which a lower torso is fixed to the upper end of the support shaft and an upper torso is flexibly mounted on the lower torso by a resilient connection which permits bending of the upper torso with respect to the lower torso. At the upper end of the upper torso a neck of the puppet figure is disposed for rotation within a socket formed in the upper torso. The figure includes a head which is resiliently mounted on the neck and tiltable thereon. A rod is connected to the neck and extends downwardly and internally within the torso and through the support platform so that the head and neck can be rotated by manipulation of the rod from beneath the platform. The rod includes a universal joint in the portion adjacent to the resilient connection between the upper and lower torsos. Control lines are attached to the head and upper torso at selected locations thereon, and such control lines are passed downwardly through suitable openings in the support platform. By reason of such construction the head may be tilted or rotated with the neck independently of and without restriction to bending movement of the upper torso about the lower torso. It is yet another object of this invention to incorporate the foregoing features in a novel puppet apparatus.

The puppet figure of the present invention also includes articulated arms which are connected to the upper torso and which have hands at the extremities thereof. It is a further object of this invention to provide a novel control arrangement for manipulating such hands and arms from beneath the support platform and in a manner that permits free movement and precise control of such hands and arms.

Articulated lower limbs depend from the lower torso, and it is another object of this invention to incorporate weighted feet thereon for facilitating manipulation of such lower limbs during similated walking movement of the puppet figure.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention.

Figure 1:
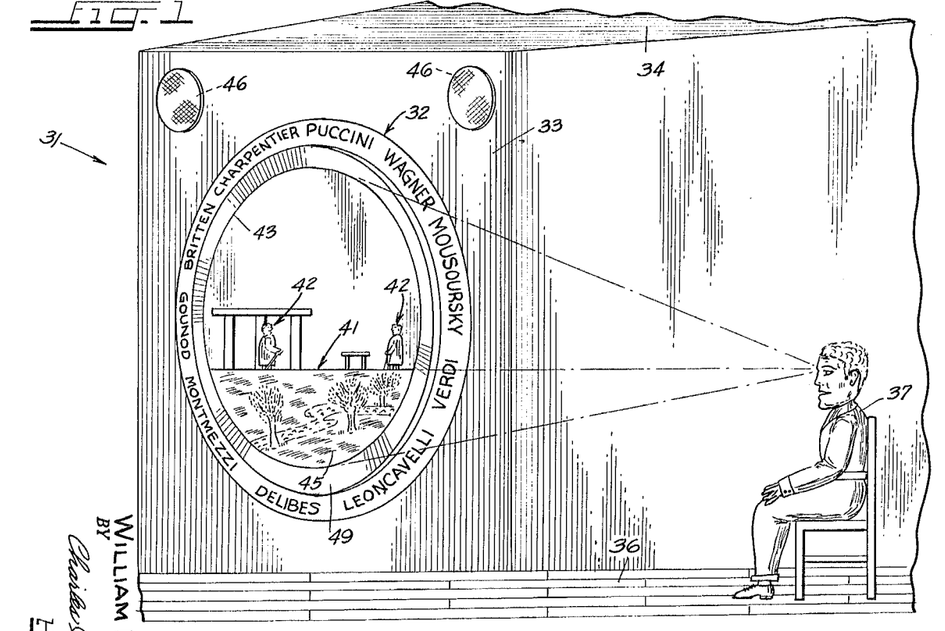
FIG. 1 is a perspective view of a puppet theater constructed in accordance with one embodiment of the present invention and illustrates the relationship between the position of the proscenium and a member of the audience.

In FIG. 1 a puppet theater constructed in accordance with one embodiment of the present invention is indicated generally by the reference numeral 31. The puppet theater 31 includes a proscenium 32 which is mounted within a wall 33. Preferably, the wall 33 extends uninterruptedly between a ceiling 34 and a floor 36 of a room or hall in which a number of people, such as the observer 37, are seated to comprise the audience for the puppet theater 31.

As will presently be described in greater detail the puppet theater includes a stage 41 disposed rearwardly of the proscenium 32, and one or more puppets 42 are movable between the various locations on the stage and are adapted to be manipulated from beneath the stage.

In accordance with the present invention the proscenium 32 includes a circular opening 43 which forms an arch over the upper surface of the stage 41. It is an important feature of the present invention that the proscenium and stage are positioned in a predetermined manner with respect to the members of the audience. Thus, as illustrated in FIG. 1 the upper surface of the stage 41 is disposed slightly below the center of the proscenium opening 43 and substantially at the eye level of a seated member of the audience. By reason of this particular disposition of the proscenium and stage with respect to the audience, an effect of realism is quite effectively achieved.

As illustrated in FIG. 1, the proscenium 32 may preferably include a front surface design incorporating the names of leading composers in the field of Grand Opera. The proscenium 32 also includes a replaceable frontpiece 45 which blocks off the lower portion of the stage 41 from the view of the audience and which may depict a scene suitable for the particular act being portrayed on the stage.

The puppet figures 42 are preferably manipulated in accompaniment to music, singing, or other audible phenomena, and for the purpose of broadcasting such music or the like the wall 33 may have speakers 46 mounted therein and hidden from view by suitable fabric coverings or the like.

Figure 4:
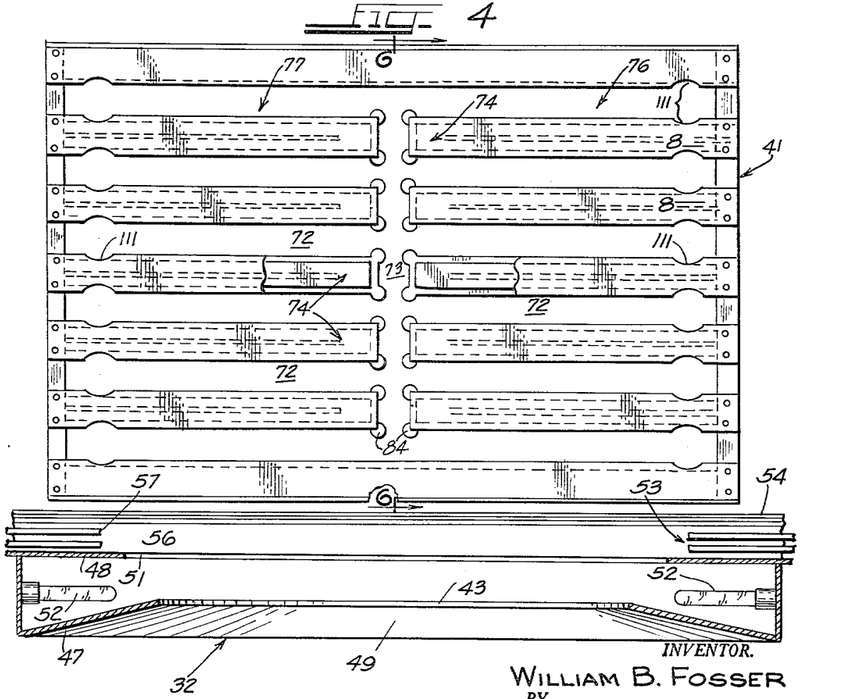
FIG. 4 is a plan view of the stage of the puppet theater and partly in section through the proscenium.

With reference to FIG. 4, it is seen that the proscenium 32 is of annular construction and includes a pair of partition members 47 and 48 which are slightly spaced from one another. The forward partition 47 includes an annular surface 49 which tapers inwardly and rearwardly about the opening 43. The rearward partition 48 is formed with a circular opening 51 of slightly larger diameter than the opening 43, and lighting means, in the form of a plurality of tubular light bulbs 42, are disposed within the annular chamber defined between the partitions 47 and 48.

Figure 2:
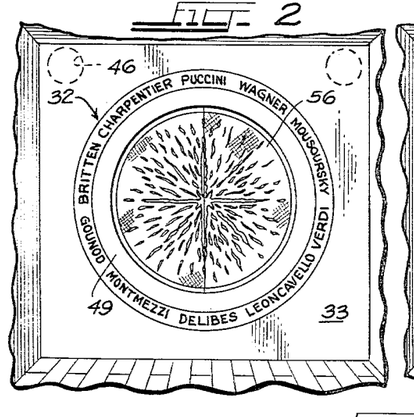
FIG. 2 is a front elevation view of the puppet theater showing the illusion curtain of the proscenium in a closed position.
Figure 3:
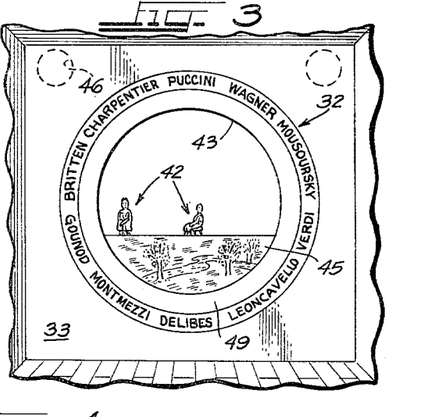
FIG. 3 is a view like FIG. 2 but with the curtains of the proscenium in an open position.

Curtain means 53 are disposed between the partition 48 and a scenery holder 54 which mounts the frontpiece 45. Preferably, the curtain means 53 include an illusion curtain or screen 56 and a blackout curtain 57. The illusion curtain 56 may be formed from expanded metal or like material so as to lend a quite decorative effect to the proscenium when drawn to the closed position illustrated in FIG. 2. In such a closed position the blackout curtain 57 is also drawn and the annular array of light bulbs 52 afford illumination for the illusion curtain or screen.

Figure 5A:
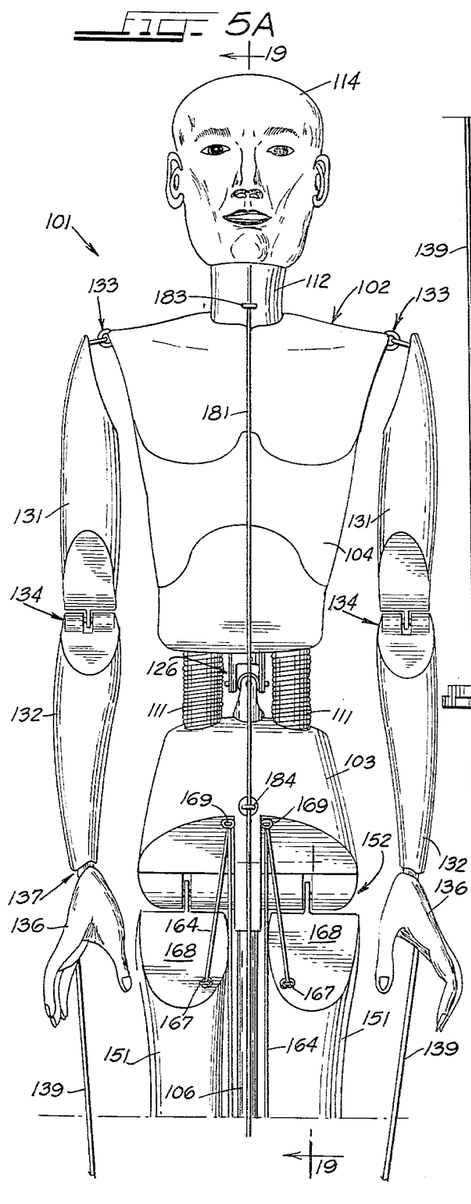
FIGS. 5A and 5B are related front elevation views of a puppet apparatus utilized in the puppet theater.
Figure 5B:
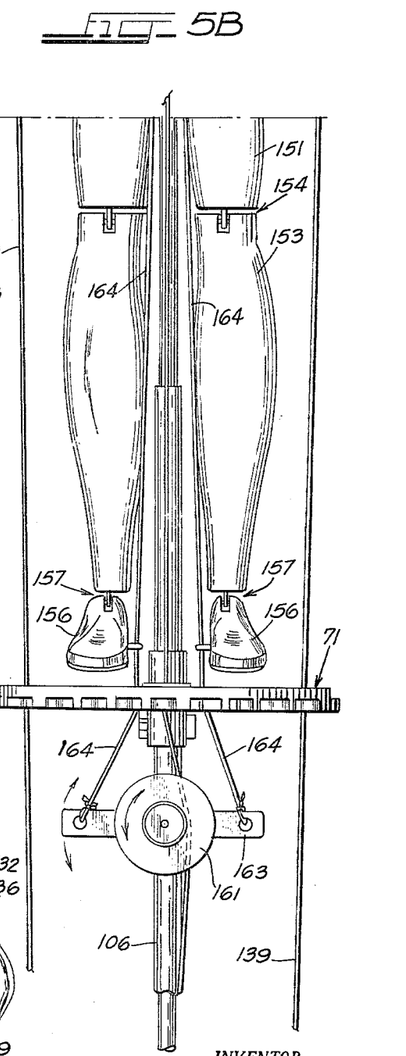
Figure 6:
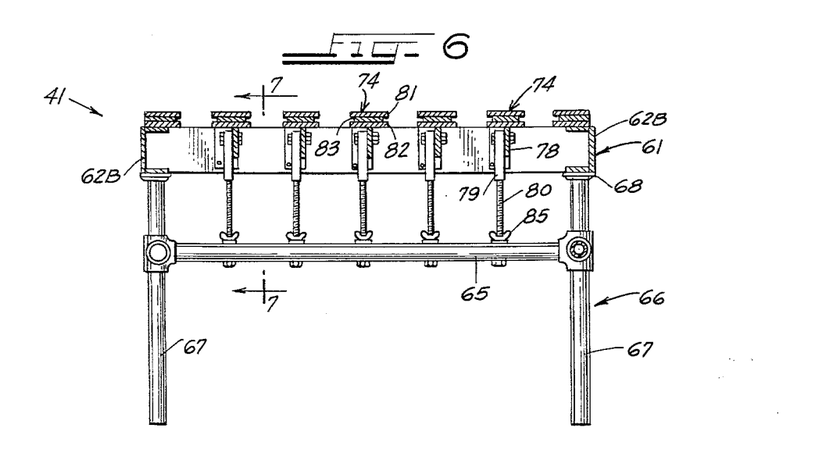
FIG. 6 is an elevation view showing details of the stage construction and taken substantially along the line indicated by the arrows 6—6 in FIG. 4.
Figures 7, 8, 9, 10:
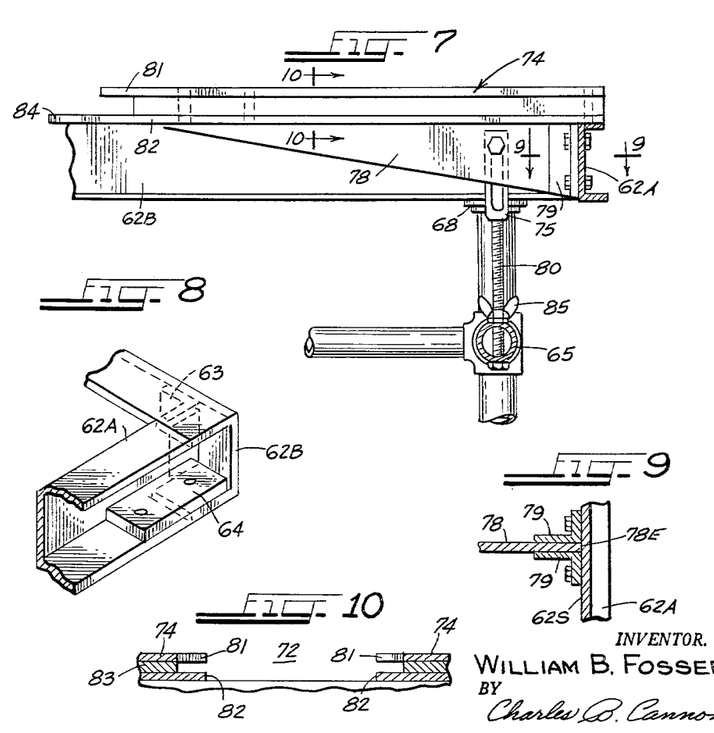
FIG. 7 is a fragmentary view taken substantially in the direction of the arrows 7—7 in FIG. 6.
FIG. 8 is a fragmentary view illustrating details of the construction of corner portions of the stage of puppet theater.
FIG. 9 is a fragmentary view taken substantially in the direction of the arrows 9—9 in FIG. 7.
FIG. 10 is a fragmentary view taken substantially along the lines indicated by the arrows 10—10 in FIG. 7.

With reference now to FIGS. 4–12 it is seen that the stage 41 comprises a box frame 61 which is preferably formed by interconnected channel members 62A and 62B. With particular reference to FIG. 8 a preferred connection of the channel members 62A and 62B at the corners of the frame 61 is illustrated. Thus, a channel member as 62A may have a portion of the upper and lower flanges thereof cut away from the web portion of the channel so that that portion of the web may be inserted between corresponding flanges of a second channel member 62B. An angle piece 63 is abutted against the interlocked portions of the channel 62A and 62B and rigidly connected thereto, and a plate member as 64 is also attached to the aligned portions of corresponding flanges on the channels 62A and 62B. It will thus be apparent from the construction illustrated in FIG. 8 that a quite rigid box frame is thus afforded without the necessity of having resort to any additional reinforcing structure between the channels 62A or 62B. This is important inasmuch as the interior of the frame 61 is thus made free of any frame structure that might otherwise obstruct movement of the puppet apparatus between various locations on the stage.

As best illustrated in FIG. 6 the box frame 61 is supported on a frame base 66 which comprises vertically extending tubular members 67 and horizontally extending members 65. Circular plates or caps 68 are threaded on the upper ends of the tubular support members 67 and in effect afford pedestals engageable with the undersurface of the lower flanges of the channels 62B. The frame 61 may be attached to the frame base 67 in any suitable manner. It has been found advantageous to incorporate adjustable C-clamps for clamping the channels 62 to the caps 68.

As noted hereinabove, it is an important feature of the present invention that the upper surface of the stage 41 be disposed substantially at the eye level of the members of the audience seated in front of the proscenium. By way of example, it has been found quite effective to position the upper surface of the stage 41 at a height of 4 feet and 2 inches above the floor level of the room in which the members of the audience are seated.

In accordance with the present invention the stage 41 is formed with guide means adapted to receive a support platform of the puppet apparatus, such as the support platform indicated by the reference numeral 71 in the puppet apparatus illustrated in FIGS. 11–14. As illustrated in FIG. 4 such guide means include a plurality of parallel disposed trackways 72 extending laterally across the stage and an interconnecting trackway 73 which extends from the front of the stage to the rear of the stage and transversely to the trackway 72.

With continued reference to FIG. 4 it is seen that the trackways 72 and 73 are defined by a plurality of individual track members 74 which are arranged in two sets, as indicated generally by the reference numerals 76 and 77. Thus, a track member in the set 76 is aligned with a corresponding track member in the opposite set but is slightly spaced therefrom so as to thereby define the front to rear trackway 73. Each track member 74 is connected at one end to fixed frame structure of the stage 41 and projects inwardly toward the center of the stage in a cantilever manner from the end thus connected to the fixed frame structure.

This construction is best illustrated in FIGS. 6 and 7 wherein it is seen that each track member 74 includes a depending web 78 of a generally triangular configuration affixed to the undersurface of the track member. The large end of the web 78 is slidably disposed between a pair of angle pieces 79 which, as illustrated in FIG. 9, are connected to the inner surface of a channel member 62A so as to define a vertically extending guide for the web 78. The end edge 78E of the web 78 thus abuts the inner surface of the channel 62S.

Figure 11:
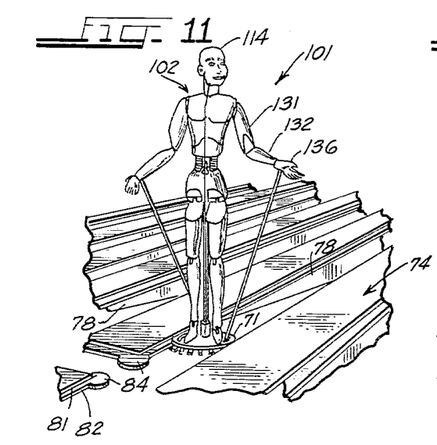
FIG. 11 is a perspective view showing the manner in which the puppet apparatus is associated with and supported by the stage.
Figure 12:
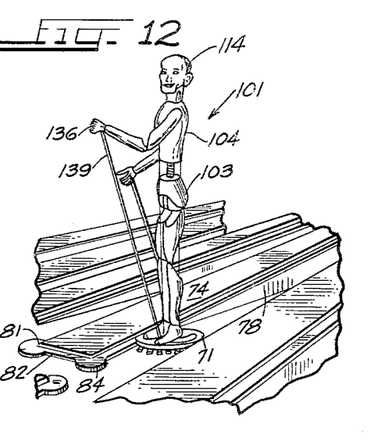
FIG. 12 is a view like FIG. 11 but illustrating the puppet figure as rotated to a different angle.

The above-noted connection between the track members 74 and the fixed frame stucture of the stage 41 is preferably made adjustable so as to permit exact alignment of the track members with one another to thereby prevent canting of the puppet figure when mounted in the trackways in the manner illustrated in FIGS. 11 and 12, and this will become more apparent from the description to follow. Thus, as illustrated in FIGS. 6 and 7 a turnbuckle 75 is bolted to each web 78 in a portion of the web which is closely adjacent to that slidable between the angles 79. A bolt 80 is passed upwardly through suitable openings formed in the horizontally extending tubular member 65 which is attached to the tubular uprights 67 so that the head of the bolt engages the underside of the member 65. The upper end of the bolt 80 is threaded within a depending end of the turnbuckle 75. A wing nut 85 is also threaded on the portion of the bolt extending between the tubular member 65 and the turnbuckle 75 and serves to lock the bolt 80 in any adjusted postion. Thus, rotation of the bolt 80 within the turnbuckle 75 is effective to vary the vertical position of the track member 74 with respect to the fixed frame structure of the stage 41.

Each of the track members 74 includes flange means for engaging the upper and lower surfaces of the platform 71 of the puppet apparatus in slidable relation therein. Thus, as best viewed in FIGS. 10–12 each track member includes a pair of horizontal extending and vertically spaced-apart flanges 81 and 82 which partially define the side walls of a trackway 72. It has been found advantageous to construct each of the track members 74 as a three-piece assembly wherein a pair of upper and lower plates afford the flanges 81 and 82 and sandwich a spacer plate 83 therebetween. Utilizing such construction the lower plate in each instance can readily be formed with circular tabs or projections 84 at the free ends of the track members. Such tab members are effective to maintain engagement of the track members with the lower surface of the platform member 71 of the puppet apparatus during those instances in which the puppet apparatus is shifted from a laterally extending trackway 72 to the transversely extending trackway 73. In this manner, and as will be evident from an inspection of FIGS. 11 and 12, the tab members 84 prevent any dropping or dipping of the puppet apparatus at such times as the puppet apparatus may be moved through the intersections of the trackways.

With particular reference to FIGS. 5A and 5B and FIGS. 11–22, the puppet apparatus of the present invention will now be described. In these figures the puppet apparatus is indicated generally by the reference numeral 101. The puppet apparatus 101 comprises both a figure 102 and means, which include the support platform 71 noted hereinabove, for supporting the puppet apparatus on the track members 74 of the stage. The figure itself comprises two basic component parts, a lower torso 103 and an upper torso 104. A support shaft 106 is fixed at an upper end to the lower torso 103 and extends downwardly through a central opening in the platform 71 and terminates in an enlarged handle 107. The handle 107 thus enables the entire puppet apparatus 102 to be picked up or moved within the trackways in a convenient manner.

With particular reference to FIGS. 5A and 5B it is seen that the upper torso 104 is resiliently mounted on the lower torso 103 so that the upper torso is permitted to bend freely with respect to the lower torso about the waist of the puppet figure. The structural means affording such a resilient connection between the two torso sections may preferably comprise a pair of parallel disposed coil springs 111. Each coil spring is seated within a suitable recess formed in the facing surfaces of the respective upper and lower torsos 104 and 103, and this construction is best illustrated in the sectional showing of FIG. 19.

By reason of the relative proportions of the sizes of the upper and lower torsos a quite advantageous balance of the weight of the puppet figure is achieved. That is, the greater portion of the weight of the torso of the puppet figure is centered within the chest of the upper torso 104 to thereby facilitate manipulation of the puppet figure as will become more apparent hereinafter.

Figures 19, 20, 21, 22:
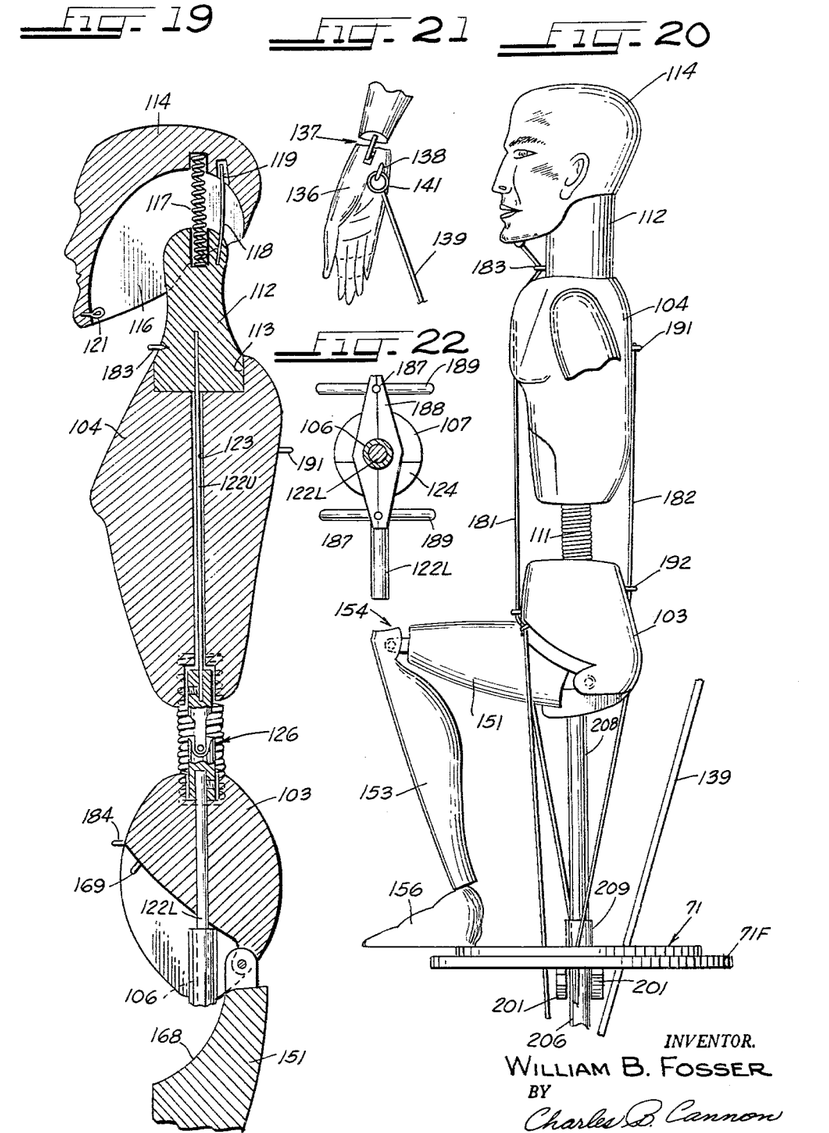
FIG. 19 is a side elevation view in section of the puppet apparatus and is taken substantially along the line indicated by the arrows 19—19 in FIG. 5A.
FIG. 20 is a side elevation view showing the puppet figure in a seated position.
FIG. 21 is a fragmentary view illustrating details of the connection of a control rod to a hand of the puppet figure.
FIG. 22 is a detail view taken substantially along the line indicated by the arrows 22—22 in FIG. 13.

A neck 112, as best illustrated in FIG. 19, is rotatably disposed within a socket 113 formed in the upper end of the upper torso 104. A head 114 is formed with a generally concave recess 116 in the undersurface thereof so as to fit over the upper end of the neck 112 and thereby cap such portions of the neck from view. A coil spring 117 is seated at opposite ends within suitable recesses formed in the head and the neck and thus affords a resilient connection therebetween. Additionally, a flat or leaf spring 118 is disposed generally parallel to the coil spring 117 and is fixed at one end within a slot formed in the upper end of the neck 112. At the opposite end the spring 118 is received within an enlarged groove 119 so that some lost motion is permitted between the spring 118 and the head 114. By reason of the manner in which the springs 117 and 118 are associated with the neck 112 and head 114 the suspension of the head from the neck enables a quite realistic effect to be achieved during the manipulation of the puppet figure. That is, the coil spring 117 enables the head to be suspended in a quite flexible manner, and the lost motion afforded between the spring 118 and the groove 119 prevents the spring 118 from hindering such flexibility. However, upon tilting or nodding of the head 114 under the control of a line attached to an eyelet 121 affixed within the concave recess 116, and in a manner to be described in greater detail hereinabove, the leaf spring 118 comes into effect to afford a positive restoring force and prevent distortion of the coil spring 117.

Figures 13, 14:
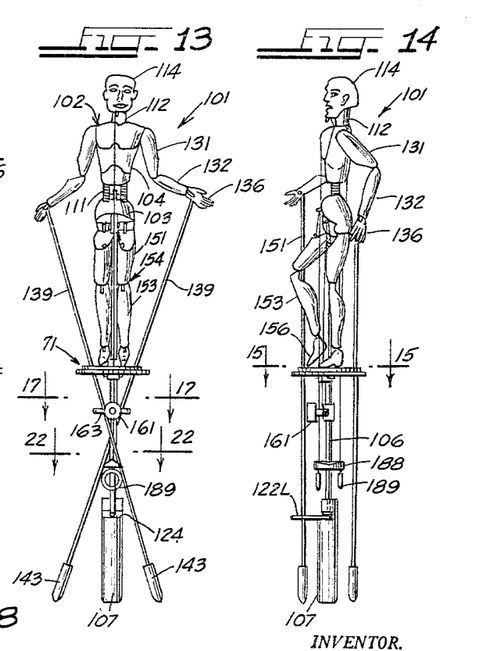
FIG. 13 is a front elevation view of the puppet apparatus shown in FIGS. 11 and 12.
FIG. 14 is a side elevation view of the puppet apparatus.

A control rod 122 is integrally affixed to the neck 112 and extends downwardly from the neck 112 to the handle 107. An upper section 122U of the control rod extends downwardly within a vertically extending opening 123 formed in the upper torso 124. A lower section 122L of the control rod extends downwardly through the lower torso 103 and concentrically within the hollow interior of the support shaft 106. The lowermost end of the section 122L of the control rod is bent outwardly at a right angle, as illustrated in FIG. 14, and is slidable on a recessed surface 124 of the handle 107. Thus, the outwardly projecting end of the lower section 122L of the control rod for the neck 112 may be swung through an arc of approximately 180 degrees to produce a corresponding rotation of the neck 112 and the head 114.

With reference again to FIG. 19 it is seen that a universal joint 126 connects the upper and lower sections of the control rod in the area extending between the coil springs 111. In this manner, the neck and head may be rotated independently of and without any obstruction to bending movement of the upper torso 104 about the lower torso 103.

With reference to FIGS. 5A and 11–14 it is seen that the puppet figure 102 includes articulated arms connected to the upper torso 104. Each arm includes an upper arm 131 and a forearm 132. The upper arm 131 is connected to the upper torso 104 in a double eyelet connection 133 which affords a universal joint. The forearm 132 is in turn connected to the upper arm 131 by a hinge-type joint 134.

As best illustrated in the detail view of FIG. 21, a hand 136 is connected to the extremity of the forearm 132 by hinged-type joint 137. An eyelet 138 is mounted within the palm of each hand 136 for free swivelling movement therein. A wire rod 139 is formed with an eyelet 141 at an upper end thereof and the eyelet 141 is interlooped within the eyelet 138 so that the wire rod 139 is connected to the hand 136 in a universal joint. As best illustrated in FIGS. 11 and 12 each wire rod 139 extends downwardly and passes through an arcuate-shaped and elongated slotted opening 142 formed in the support platform 71. An enlarged tip 143 is integrally attached to the lowermost end of each wire rod 139 and facilitates manipulation of the arms and hands of the puppet figure 102, as will be apparent from an inspection of FIGURES 11–14.

The puppet figure 102 also includes articulated legs which depend from the lower torso 103. Thus, as best illustrated in FIGS. 5A and 5B, each leg includes an upper portion 151 which is connected to the lower torso 103 in a hinge connection 152. Lower leg members 153 are in turn connected to the upper members 151 at hinge joints 154. Feet 156 are connected to the lowermost extremities of the members 153 in hinge joints 157, and such feet 156 are preferably rather heavily weighted, as by being cast of lead or other dense material, to facilitate manipulation of the legs of the puppet figure during such periods as the articulated legs of the puppet figure are to be moved to simulate walking.

Figure 15:
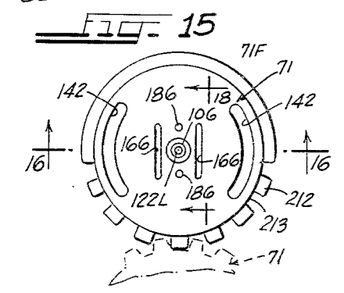
FIG. 15 is a plan view of a platform member incorporated in the puppet apparatus and is taken along the lines indicated by the arrows 15—15 in FIG. 14.
Figures 16, 17:
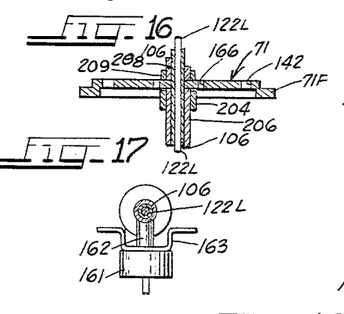
FIG. 16 is a detail view in section taken substantially along the line indicated by the arrows 16—16 in FIG. 15.
FIG. 17 is a detail view of control structure for manipulating the legs of the puppet figure and is taken substantially along the line indicated by the arrows 17—17 in FIG. 13.

As best illustrated in FIG. 5B and the detail showing of FIG. 17 a control knob 161 is spaced radially from the support shaft 106 by a boss or sleeve 162 and is mounted for rotation on the end of such sleeve 162. A generally U-shaped bar 163 is connected for rotation with the knob 161 whereby rotation of the knob 161 in the directions indicated by the arrows in FIG. 5B swings the ends of the bar 163 through the arcs indicated by the arrows in FIG. 5B. A control line 164 is connected to each end of the bar 163 and is passed upwardly through a linear slot 166 in the support platform 71 (see FIG. 15). Each control line 164 is connected to an eyelet 167 in a downwardly inclined surface 168 formed on the upper end of each of the leg members 151 and is looped through eyelets 169 connected to the lower torso 103. Thus, by oscillating the knob 161 each leg of the puppet can be alternately raised to the position illustrated in FIG. 14 to simulate walking movement of the puppet figure while the entire puppet apparatus is being moved between different locations on the stage within the trackways 72 and 73.

As noted hereinabove, the head 114 can be tilted upwardly and downwardly on the neck 112 and the upper torso 104 can be tilted back and forth about the resilient connection afforded by the springs 111 and the universal joint 126 at the waist of the puppet figure. As best illustrated in FIGS. 5A, 5B, and 20, the means for accomplishing such movement of the puppet figure include a forward control line 181 and a rear control line 182. The forward control line 181 is connected at its upper extremity to an eyelet 121 (see FIG. 19) embedded within the recess 116 in the head of the puppet figure adjacent that portion of the head which comprises the chin of the puppet figure. The control line 181 is then passed through a retaining eyelet 183 which is embedded within the neck 112. Thereafter, the control line 181 is passed through an eyelet 184 on the front side of the lower torso 103. This latter eyelet serves primarily to hold the control line 181 closely adjacent the body of the puppet figure so as to facilitate concealment of the control line by the costume of the puppet figure. From the eyelet 184 the control line 181 extends downwardly through a small circular opening 186 in the support platform 71 (see FIG. 15) and is thereafter passed through another opening 187 in a control bar 188 (see FIG. 22). The control bar 188 is suitably affixed to the support shaft 106 in any suitable manner, as by soldering or brazing, and the control bar 188 is conveniently disposed adjacent the upper end of the handle 107. A ring 189 is tied to the lowermost extremity of the control line 181 whereby an operator can, by inserting a finger within the ring 189 and pulling downwardly thereon, sequentially cause the head 118 to be tilted downwardly and, by increasing the downward force exert on the ring 189, subsequently cause the upper portion of the puppet figure to bend forwardly from the waist.

The rear control line 182 is, as best illustrated in FIG. 20, connected at its upper extremity to an eyelet 191 embedded within the back of the upper torso 104. The control line 182 is thereafter passed downwardly through a retaining eyelet 192 on the lower torso 102 and through openings 186 and 187 which correspond to the respective openings for the forward control line in the support platform 71 and control bar 188. A second ring 189 is tied to the lowermost end of the control line 182 in the same manner as the control ring for the forward control line 189. It will be apparent therefore that downward movement of the line and rear control line 182 will be effective to cause the upper torso of the puppet figure to bend rearwardly from the waist.

From the foregoing it is seen that the puppet apparatus 101 includes control means—in the form of the above-described lines 189, knob 161, rotatable rod 122, and wire rods 139—which are disposed beneath the support platform 71 and which are adapted to permit convenient and accurate manipulation of the various component parts of the puppet figure 102. The control lines 164, 181, and 182 described hereinabove are preferably of a double-strand construction and of a transparent character. Thus, relatively clear thin strands of nylon may be preferably utilized.

In accordance with the present invention the puppet figure 102 can be moved from a standing figure as illustrated in FIGS. 5A, 5B, and 11–14 to a setting position, as illustrated in FIG. 20; and such movement of the puppet figure is accomplished in part by novel coaction between the puppet apparatus 101 and the construction of the stage 41. With particular reference to FIGS. 15, 16, and 20, it is seen that the support platform 71 includes a radially extending circumferential flange 71F, and this flange 71F is so dimensioned that the thickness of the flange adapts the flange to be interfitted in mating relation between the flanges afforded by the upper and lower plates 81 and 82 of the track members 74. Thus, as illustrated in FIGS. 11 and 12, the puppet apparatus 101 is supported in a vertical position as illustrated by the engagement of the plates 81 and 82 with the respective upper and lower surfaces of the radial flange 71F. It will be apparent, that once the puppet apparatus has been positioned in this manner within the trackways 72 and 73, that the plate members 81 and 82 prevent any vertical movement of the support platform 71. At the same time the puppet apparatus 101 may be freely moved horizontally within the trackways. Thus, the support platform 71 is adapted to afford the sole connection between the puppet apparatus and the track 41. Therefore, the entire weight of the puppet apparatus must be transmitted to the stage 41 through the support platform 71.

Figure 18:
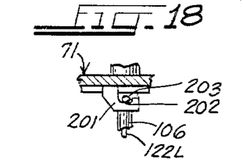
FIG. 18 is a detail view of locking mechanism for interconnecting the platform and support shaft of the puppet apparatus and is taken substantially along the lines indicated by the arrows 18—18 in FIG. 13.

In accordance with the present invention the puppet apparatus 101 includes means for releaseably connecting the support shaft 106 to the support platform 71. Such means are illustrated in the detail view of FIG. 18 and include a pair of pawls 201, only one of which is visible in FIG. 18. The pawls 201 are fixed to the underside of the support platform 71 and are curved slightly upwardly at their free ends so as to define a concave recess 202 in the upper edges thereof. A pin 203 projects radially from the support shaft 106 at diametrically opposed portions thereof and is receiveable within the recess 202 of a pawl 201. Each pin 203 may be fixed to the support shaft 106 in any suitable manner. Thus, the pins 203 may be attached to a collar 204, which may in turn be attached to a reinforcing sleeve 206 as illustrated in FIG. 16. In the disposition of the pin 203 within the recess 202 of the pawl, as illustrated in FIG. 18, the weight of the puppet figure is transferred from the support shaft 106 through the pins 203 and to the support platform 71. Thus, the weight of the puppet figure and the upturned end of the pawl 201 coact to cause the pawl and pin mechanism to function as a locking mechanism for retaining the puppet figure in the upright or standing position illustrated in FIGS. 11-14.

Should it be desired to move the puppet figure to a setting position such as that illustrated in FIG. 20 or to some intermediate position, it is necessary only to lift the handle 107 upwardly to thereby move the pins 203 out of the recesses 202 within the pawls 201. Subsequently, the shaft 106 can be rotated through approximately 90 degrees to enable the pins 203 to be dropped downwardly between the pawls 201 whereupon the support platform 71 engages the lower surface of the feet 156 to thereby cause the legs of the puppet figure to flex at the knees afforded by the hinged joints 154. During the course of the initial lifting movement of the support shaft 106, the upper plates 81 of the track member 74 engage the upper surface of the flange 71F so that the support platform 71 is at all times maintained in the plane of the trackways 72 and 73.

With particular reference to FIG. 20 it is seen that the sitting position of the puppet figure is determined by a sleeve 208 which projects upwardly from the support platform 71 in concentric relation to the support shaft 106. Thus, the upper end of the sleeve 208 abuts a lower surface of the lower torso 103 in the position illustrated in FIG. 20 to thereby limit movement of the puppet figure toward the support platform 71. Preferably, the sleeve 208 is affixed to the support platform 71, and an enlarged collar 209 may be utilized for facilitating such attachment.

As noted hereinabove, the track members 74 are formed with circular tabs 84 for preventing the puppet apparatus from dropping below the level of the tracked portion of the stage during such times as the puppet apparatus may be moved from a trackway 72 into the trackway 73. Thus, the puppet apparatus is adapted to be maintained in a fixed vertical position with respect to the stage so long as the puppet apparatus is moved about that portion of the stage which is visible to the audience. However, the present invention contemplates initial insertion of the puppet apparatus within any one of a number of conveniently varied locations on the stage. Thus, a best illustrated in FIG. 4, each of the track members 74 is formed with arcuate-shaped recesses 111 in the side thereof closely adjacent the ends engaged with the side channels 62 of the frame of the stage. Such recesses enable the circular-shaped support platform of the puppet apparatus to be inserted within a trackway 72 and subsequently moved into position between the projecting flanges of the track members.

Once the puppet apparatus is thus positioned in the trackways of the stage, it will be apparent that the various component parts of the puppet figure can be selectively manipulated by the control mechanism described in detail hereinabove to similate various movements of corresponding parts of the human body.

In some instances it may be desirable to move two or more such puppet figures to positions wherein the puppet figures may embrace one another. The present invention makes provision for such movement of the puppets by partially serrating the circumferential flange 71F. Thus, as best illustrated in FIG. 15, a portion of the flange 71F may be partially serrated to form a plurality of dogs or teeth 212 circumferentially spaced from one another by recesses 213. The width of the teeth 212 and the recess 213 are equal so that a second support platform may be moved into a position wherein the serrated portions of the flanges 71F interfit with one another to thereby enable the puppet figures to be positioned in closely adjacent relation.

From the foregoing it will be apparent that the present invention provides a novel puppet theater which enables an effect of reality to be accomplished in a quite effective manner. The puppet theater of the present invention is an integrated unit in which a novel proscenium is combined with specific stage structure and puppet apparatus in a particular manner so as to achieve the desired effect of reality. The stage structure of the present invention affords free and convenient movement of the puppet figures to any desired position thereon. Furthermore, the puppet apparatus of the present invention, in addition to being a quite highly developed mechanism capable of closely similating substantially any desired movement of the human body, is adapted to coact with the tracked structure of the stage in a unique manner to enable the desired positioning of the puppet apparatus in some selected location on the stage to be obtained and also to contribute at least in part to certain manipulations of the puppet figure.

Hence, while I have illustrated and described the preferred embodiment of the invention, it is to be understood that this is capable of variation and modification.

I claim:

1. In a puppet theater of the kind which includes a stage, channel shaped guide means lying in the plane of the upper surface of the stage and puppets supported on platforms within said guide means and movable between various locations on the stage and wherein the puppets are adapted to be manipulated from beneath the level of the stage, proscenium means including a front wall formed with a circular opening therein, which circular opening forms a frame for the puppet theater, and means for positioning said plane of the upper surface of the stage approximately midway of the height of said circular opening, means removably mounting a frontpiece having a scenic setting so as to cover the part of the stage exposed below said plane, said plane, said frontpiece having its upper edge substantially coinciding with said plane and extending from said edge to the bottom of the circular opening, its outline conforming to that of the said opening.

2. In a puppet theater of the kind in which puppets are supported on and movable between various locations on a stage and wherein the puppets are adapted to be manipulated from beneath the level of the stage: a stage formed with guide means positioned in the plane of the upper surface thereof for receiving the support platform of a puppet figure therein, said guide means comprising a plurality of parallel disposed channel-shaped trackways extending laterally across the stage and an interconnecting trackway extending from the front to the rear of the stage and intersecting the laterally extending trackways in the central portions thereof, whereby a puppet is positionable at any selected location on said stage by movement of the support platform within said parallel and interconnecting trackways; proscenium means disposed in front of said stage, said proscenium means including a front wall formed with a circular opening therein, which circular opening forms a frame for the puppet theater; and means for positioning the plane of the upper surface of the stage approximately midway of the height of said circular opening, means removably mounting a frontpiece having a scenic setting so as to cover the part of the part of the stage exposed below said plane, said frontpiece having its upper edge substantially coinciding with said plane and extending from said to the bottom of the circular opening, its outline conforming to that of the said opening.

References Cited by the Examiner
UNITED STATES PATENTS

| | | | |
|---|---|---|---|
| 482,957 | 9/1892 | Allen | 273—132 |
| 696,835 | 4/1902 | McCormick | 46—13 |
| 1,053,817 | 2/1913 | Jackson | 46—126 XR |
| 1,281,720 | 10/1918 | Tully | 272—11 |
| 1,384,963 | 7/1921 | LaBatt. | |
| 1,419,976 | 6/1922 | Mathews | 46—13 |
| 1,501,912 | 7/1924 | Meehan | 46—126 |
| 1,502,236 | 7/1924 | Dondo | 46—13 |
| 1,523,284 | 1/1925 | Powers | 46—13 |
| 1,563,582 | 12/1925 | McDade | 46—13 XR |
| 1,583,775 | 5/1926 | Brandt | 46—13 |
| 1,596,921 | 8/1926 | Childs | 46—13 XR |
| 1,788,671 | 1/1931 | Heideklang | 46—126 |
| 1,800,948 | 4/1931 | McHugh | 46—13 |
| 2,175,604 | 10/1939 | Holmes | 46—13 |
| 2,187,407 | 1/1940 | Stone | 46—13 |
| 2,327,234 | 8/1943 | Wolff et al. | 46—126 |
| 2,368,188 | 1/1945 | Wise | 46—13 |
| 2,618,896 | 11/1952 | Herzog | 46—161 |
| 2,662,338 | 12/1953 | Baird | 46—126 |
| 2,780,030 | 2/1957 | Beebe | 46—161 |
| 2,834,150 | 5/1958 | White | 46—13 |
| 3,124,896 | 3/1964 | Cook | 46—13 |

DELBERT B. LOWE, *Primary Examiner.*

RICHARD C. PINKHAM, JAMES W. LOVE,
*Examiners.*

H. S. MILLER, G. L. PRICE, *Assistant Examiners.*